United States Patent

[11] 3,556,363

| [72] | Inventor | Robert K. Whittaker |
| | | 525 West 200 South, Richfield, Utah 84701 |
| [21] | Appl. No. | 773,138 |
| [22] | Filed | Nov. 4, 1968 |
| [45] | Patented | Jan. 19, 1971 |

[54] GUN RACK FOR VEHICLES
7 Claims, 5 Drawing Figs.

[52] U.S. Cl. .................................................. 224/1, 224/45.45
[51] Int. Cl. ....................................................... A47b 81/00
[50] Field of Search ......................................... 224/29, 45.45, 1; 211/62—65

[56] References Cited
UNITED STATES PATENTS

| 2,143,900 | 1/1939 | Rarey ............................ | 224/42.45 |
| 2,919,058 | 12/1959 | Thompson ..................... | 224/1 |
| 3,273,769 | 9/1966 | Miller ............................ | 224/42.45 |
| 3,286,967 | 11/1966 | Ferrell ........................... | 211/64X |

FOREIGN PATENTS

| 18,313 | 9/1901 | Great Britain ................. | 224/1 |
| 547,064 | 10/1957 | Canada ......................... | 224/42.45 |

Primary Examiner—Gerald M. Forlenza
Assistant Examiner—Frank E. Werner
Attorney—B. Deon Criddle ABSTRACT: A two-piece gun rack for holding long guns safely and conveniently available on the inside of vehicle doors. An adjustable butt rest supports the gun and a pivotable arm having an adjustable clamp provides means for holding the gun in a set position, for movement with the door.

PATENTED JAN 19 1971

3,556,363

INVENTOR:
ROBERT K. WHITTAKER
BY:
ATTORNEY

GUN RACK FOR VEHICLES

BRIEF DESCRIPTION

The storage of guns in a vehicle has long presented many safety and convenience problems. The most common type of rack for such guns in the past has been a so-called "window rack," that is used in pickup trucks and other cabbed vehicles. This type of rack usually must be bolted to a rear cab window frame and the guns are placed in the rack so that they extend across the cab and the window. In placing a gun in such a rack it is necessary that the muzzle be pointed into the cab or toward the person positioning the gun, thereby creating an obvious safety hazard.

In addition, window racks obstruct the rear vision of the vehicle driver and they cannot be used in vehicles having seat rests extending upwardly from its seats in front of the window, or where a crawl through boot may be used in place of window glass as a pathway between the vehicle cab and a camper body carried by the vehicle. Furthermore, they usually are made such that both the stock finish and the gun bluing are damaged as the gun bounces therein.

Other racks have been proposed for carrying weapons on the outside of the vehicle, but this, of course, subjects the weapon to the effects of weather and is not satisfactory for general use.

The racks, heretofore proposed, while generally providing a storage area and holding means for guns and thereby reducing the hazards otherwise present when guns are merely placed on the floor or seat of a vehicle or are otherwise loosely positioned, still do not provide easy, safe placement or accessibility of the gun, and do not fit all conventional lengths of rifles, carbines, shotguns or other long guns.

It is an object of the present invention to provide a gun rack that will universally fit on the inside door of a vehicle to support virtually all long guns of any conventional length in such a manner that their finish is not damaged.

It is another object to provide such a gun rack wherein guns can be safely positioned therein, and removed therefrom, and still be at all times conveniently available for quick use.

Principal features of the invention include an angularly adjustable butt rest that is adapted to be secured to the lower portion of the door, and an arm that has one end adapted to be removably and pivotally connected to the upper portion of the lower door panel and that carries a pivoted and adjustable barrel engaging clip on its other end.

Other objects and features will become apparent from the following detailed description and drawing, disclosing what is presently contemplated as being the best form of the invention.

THE DRAWINGS

FIG. 1 is an elevation view showing the rack of the invention supporting one type of long gun on the inside of a vehicle door;

FIG. 2, a similar view, but with the rack supporting another kind of long gun;

FIG. 3, a perspective view of the butt plate of the rack;

FIG. 4, an exploded perspective view showing the portable arm and mounting means therefor; and FIG. 5, a fragmentary view of the support arm of the invention, arranged as in FIG. 1, but with the clamp shown side mounted and a gun barrel held therein.

DETAILED DESCRIPTION

Figure 1:
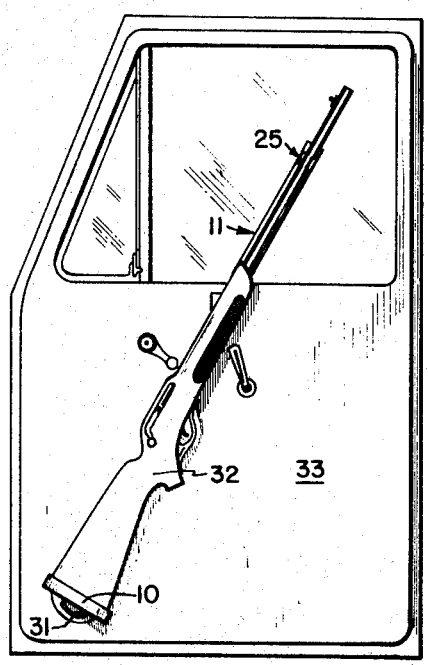

Referring now to the drawings:

In the illustrated preferred embodiment, the invention comprises a butt rest, shown generally at 10, and a support arm, shown generally at 11.

Butt rest 10 includes an attachment plate 12 having a series of arcuate slots 13 formed around the outer edge thereof and a trough 14, preferably formed integrally therewith. Trough 14 has a wall 15, one side of which is fixed to the attachment plate 12 by a spacer 15a and a bottom plate 16 that extends outwardly from the spacer 15a and that is encircled by the wall 15. The wall 15 and bottom plate 16 are preferably lined with a soft protective material 14a, such as, for example, felt.

The bottom plate 16 is elongate and is wider at one end than at the other, and both ends are curved so that it essentially conforms to the shape of the butt ends of conventional stocks found on long guns. The wide end is made wide enough to receive the largest portion of the butt end of any conventional stock within the wall and the trough narrows to a smaller end that will just receive the smaller portion of any conventional stock. The overall length of the trough is such that any conventional stock will fit therein and when the trough is properly angulated the small part of the stock will slightly wedge toward the narrowed end of the trough.

The support arm 11 comprises an elongate strap 17, angled at 17a, and having a hole 18 at one end through which a bolt 19 is adapted to be inserted before being threaded into a threaded hole 20 of a small adapter plate 21. The other end of elongate strap 17 has a plurality of spaced holes 22 therealong for a purpose to be further explained.

The angle 17a and the spacer 15a insure that the holding parts of both the butt rest and the support arm will be set far enough away from the door that a gun therein will clear any knobs or arm rests on the door.

A pair of screws 23 are adapted to be inserted through holes 24, provided therefore in the plate 21, and to be screwed into the window frame or other suitable structure of the upper portion of the lower door panel of the vehicle. The heads of screws 23 are then set into recessed portions of the holes 24 so that the strap 17 can be pivoted without obstruction. The strap 17 can also be readily removed by removing bolt 19 and the small adapter plate 21 will not obstruct operation of the window or door operators and will not present an unsightly appearance when no long gun is being carried in the vehicle.

Figure 2:
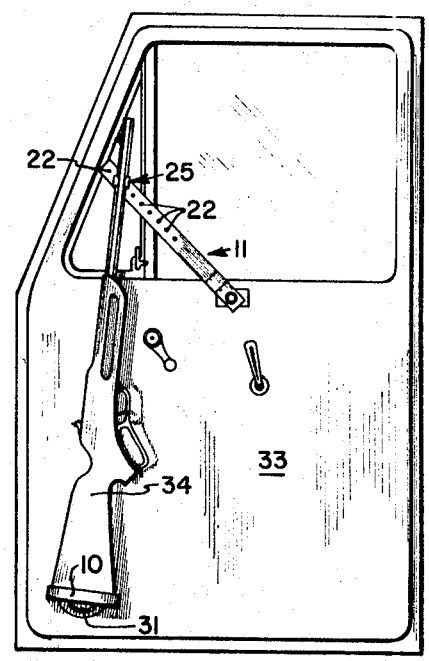
Figure 3:
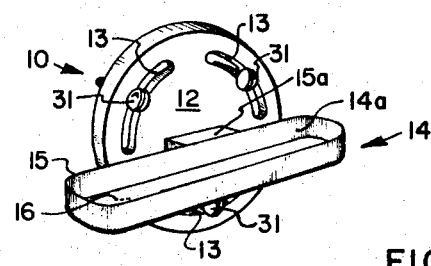
Figure 5:
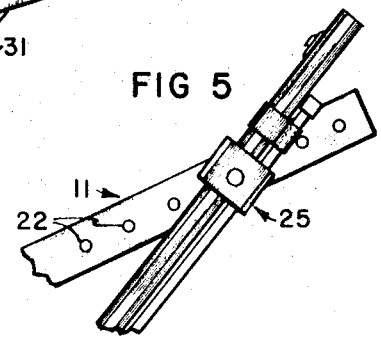
Figure 4:
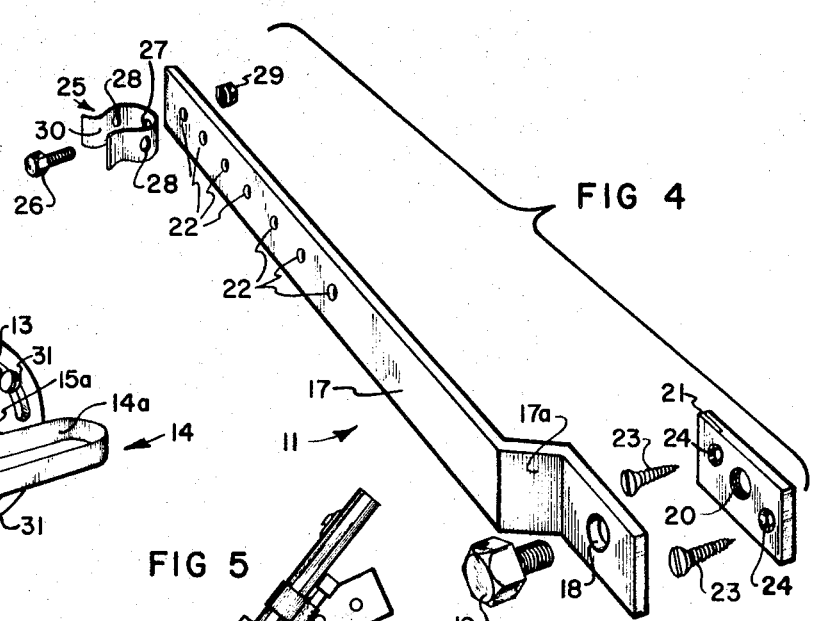

A spring, horseshoe clip 25 is pivotally, but removably mounted to the end of strap 17 opposite bolt 19, as by a bolt 26 that is passed through either a hole 27 in the back of the clip or a hole 28 in one side thereof and one of the holes 22, before being secured in place by nut 29. The inside of the clip is preferably lined with a soft protective material 30, such as, for example, felt. Spring clip 25 can thus be mounted at any of the holes 22 with its back fixed to strap 17, as shown in FIGS. 1 and 2, or it can be mounted with a side fixed thereto, as shown in FIG. 5. The mounting of FIG. 1 and 2 will normally be preferred for carrying single barreled guns or side-by-side double-barreled guns while the arrangement of FIG. 5 may be preferred for guns having over and under barrel arrangements or guns having tubular magazines, for example.

In use, screws 31 are inserted through the respective arcuate slots 13 of the attachment plate 12 and are screwed into the lower door frame or other suitable structure of the lower portion of the lower door panel and the trough 14 is positioned, as desired, before the screws are tightened down. Because of the arcuate slots, the attachment plate 12 can be rotated with respect to screws 31 to thereby change the angle of the trough 14. Thus, the trough can be positioned to accommodate guns of different lengths, as well as the many different angles of butt plates found on different gun stocks.

A longer gun, such as the rifle 32, shown in FIG. 1, or a shotgun, will frequently fit on the door 33 of a vehicle (not shown) if it is positioned to extend diagonally thereacross, whereas a shorter gun, such as the carbine 34 shown in FIG. 2, may conveniently fit almost vertical on the door at the forward edge thereof. In either case the trough 14 can be angulated such that the gun stock will slightly wedge toward the narrow end of the trough and will be secured in place. Because the attachment plate 12 is mounted to be turned and because the strap 17 can be pivoted by releasing and then retightening bolt 19 and the spring clip 25 can be positioned along the length of strap 17 and be either back mounted or side mounted, and is pivotable, the entire assembly can be readily positioned to accommodate virtually any long gun including double-barreled guns, over and under guns, and tubular magazine guns.

The materials 14a and 30 that are used to line trough 14 and clip 24, respectively, allow the rack to securely grip a gun, without scratching or wearing off the bluing or damaging of the stock.

Because the rack opens with the door, the gun does not need to be lifted out of a vehicle and there is little danger of its being inadvertently pointed at anyone either inside or outside of the vehicle. Conversely, the gun is pointed upright at all times as it is placed in the rack while the vehicle door is open and in this situation, as well, there is little danger that it will be pointed at anyone, either inside or outside of the vehicle.

Although a preferred form of my invention has been herein disclosed, it is to be understood that the present disclosure is by way of example and that variations are possible, without departing from the subject matter coming within the scope of the following claims, which subject matter I regard as my invention.

I claim:

1. A gun rack for vehicles comprising:
    a butt rest adapted to be secured to the lower portion of the inside panel of a vehicle door and including a walled trough projecting from the face thereof in which the butt of a long gun is adapted to rest and means for attaching the butt rest to the door such that it can be pivoted to vary the angular relationship of the trough to the door;
    a support arm including a strap having one end adapted to be mounted so as to be pivoted from the upper portion of the inside bottom panel of the vehicle door;
    a spring clip adapted to grip the barrel of a long gun; and means for pivotally mounting the spring clip on the other end of the strap.

2. A gun rack for vehicles as in claim 1, wherein the means for attaching the butt rest includes curved slots through the butt rest, through which screws are adapted to be inserted into the door.

3. A gun rack according to claim 2, wherein the support arm further includes:
    an adapter plate having a threaded hole therein and means for attaching it to the vehicle door; and
    a bolt adapted to pass through a hole in one end of the strap and to be threaded into the threaded hole of the adapter plate.

4. A gun rack according to claim 2, wherein the trough is elongate and is wider at one end than the other; and wherein the wall of the trough is connected at one side thereof to the attachment plate.

5. A gun rack according to claim 4, wherein the strap is angled outwardly, intermediate its length and the trough is connected to the wall through a spacer.

6. A gun rack for vehicles comprising:
    a butt rest, adapted to be secured to the lower portion of the inside bottom panel of a vehicle door and to supportingly receive the butt of a long gun;
    a support arm, including a strap having one end adapted to be mounted so as to be pivoted from the upper portion of the inside bottom panel of the vehicle door;
    a spring clip adapted to grip the barrel of the long gun, said clip being of horseshoe configuration with a hole through the back thereof and a hole through at least one side thereof; and
    means for pivotally mounting the spring clip on the other end of the strap.

7. A gun rack according to claim 6, wherein the means for pivotally mounting the spring clip comprises a bolt adapted to be passed through one of the holes in the clip and through one of a series of holes spaced along the strap, and a nut.